United States Patent [19]

Strack et al.

[11] Patent Number: 4,608,236
[45] Date of Patent: Aug. 26, 1986

[54] PROCESS FOR THE PRODUCTION OF A SEED MIXTURE FOR FAUJASITE SYNTHESIS

[75] Inventors: Hans Strack, Alzenau; Peter Kleinschmit, Hanau, both of Fed. Rep. of Germany

[73] Assignee: Degussa Aktiengesellschaft, Frankfurt, Fed. Rep. of Germany

[21] Appl. No.: 593,164

[22] Filed: Mar. 26, 1984

[30] Foreign Application Priority Data

Mar. 29, 1983 [DE] Fed. Rep. of Germany ....... 3311339

[51] Int. Cl.$^4$ ............................................. C01B 33/26
[52] U.S. Cl. .................................... 423/118; 423/328; 423/329; 502/79
[58] Field of Search ....................... 423/118, 328, 329; 502/79

[56] References Cited

U.S. PATENT DOCUMENTS

| 2,882,244 | 4/1959 | Milton | 423/328 |
| 3,130,007 | 4/1964 | Breck | 423/328 |
| 3,433,589 | 3/1969 | Ciric et al. | 423/329 |
| 3,574,538 | 4/1971 | McDaniel et al. | 423/329 |
| 3,808,326 | 4/1974 | McDaniel et al. | 423/329 |
| 4,160,011 | 7/1979 | Estes et al. | 423/328 |
| 4,166,099 | 8/1979 | McDaniel et al. | 423/329 |
| 4,228,137 | 10/1980 | Taylor et al. | 423/329 |
| 4,376,106 | 3/1983 | Miyanohara et al. | 423/328 X |

FOREIGN PATENT DOCUMENTS 2014451 4/1970 France ................................. 423/328

Primary Examiner—John Doll
Assistant Examiner—Jackson Leeds
Attorney, Agent, or Firm—Beveridge, DeGrandi & Weilacher

[57] ABSTRACT

A seed mixture is produced by reacting an amorphous, synthetic sodium aluminum silicate with an Na$_2$O-supplying compound in an aqueous system at temperatures of 10° to 35° C. (room temperature). The seed mixture exhibits a composition of Na$_2$O:Al$_2$O$_3$:SiO$_2$:H$_2$O=(12±3):1:(15±3):(240±60). This seed mixture can be used in the synthesis of zeolite Y and/or zeolite X.

12 Claims, No Drawings

PROCESS FOR THE PRODUCTION OF A SEED MIXTURE FOR FAUJASITE SYNTHESIS

The invention relates to a process for the production of a seed mixture for faujasite synthesis.

Faujasite is a synthetic sodium aluminosilicate with a three-dimensional network of channels and cavities. On the basis of its chemical composition and structure and its temperature stability and modifiability, faujasite shows extraordinary catalytic properties, which make possible its use in, for example, cracking catalysts. Faujasite is sometimes also referred to as "zeolites".

In the use in cracking catalysts, the radiographic phase purity, degree of crystallinity, $SiO_2/Al_2O_3$ ratio, and adsorption properties play a central part (German AS 1,203,239; German Pat. No. 1,098,929; German Pat. No. 1,038,016).

It is known to prepare seed mixtures for faujasite synthesis from water, alkali metal hydroxide, silicon dioxide, and aluminum oxide, by mixing sodium silicate and sodium aluminate with each other (German Pat. No. 1,930,705; U.S. Pat. No. 4,228,137; U.S. Pat. No. 3,433,589).

The production of this seed mixture requires an exact metering of the components. According to Example 1 of German Pat. No. 1,930,705, the ratio of the components $Na_2O:Al_2O_3:SiO_2:H_2O = 15:1:15:165$. Disadvantageously, even minor deviations from this lead to defective crystallizations. In addition, this inherently pumpable mixture occasionally gels to a compact mass, which can be converted back into the pumpable state only with a loss of the seed properties.

From U.S. Pat. No. 4,228,137, seed mixtures with the composition $Na_2O:Al_2O_3:SiO_2:H_2O = 11:1:11.3:240$ are known, which are produced from calcined clays. A disadvantageous factor in this case is that only special clay grades possess seeding properties after calcination and, as natural products, are always subject to variations in their chemical composition. Contaminations with foreign ions can also have a disadvantageous effect on the seeding properties.

The object of the invention is to create a process for the production of a seed mixture for faujasite synthesis, which can be produced economically and with good reproducibility within narrow tolerance limits.

A further object of the invention is to provide a process for the synthesis of faujasite using a seed mixture as described herein.

The feature of the invention is a process for the production of a seed mixture for faujasite synthesis, which is characterized by the fact that an amorphous, synthetic sodium aluminum silicate is reacted with an $Na_2O$-supplying compound in an aqueous system at temperatures at 10° to 35° C. in such a way that the composition of the mixture obtained is $Na_2O:Al_2O_3:SiO_2:H_2O = (12\pm3):(15\pm3):(240\pm60)$ and this mixture is allowed to age for at least 24 hours, preferably at 10° to 35° C. (room temperature).

A further feature of the invention is to use the seed mixture to prepare faujasite.

In a preferred embodiment, the amorphous sodium aluminum silicate exhibits the following properties:
$SiO_2$ content: 70–90% (based on anhydrous substance)
$Al_2O_3$ content: 6–10% (based on anhydrous substance)
$Na_2O$ content: 5–9% (based on anhydrous substance)
BET surface area: 50–150 $m^2/g$
pH value: 10–11

The amorphous sodium aluminum silicate can be prepared by the known process according to German Pat. No. 1,299,616, and U.S. Pat. No. 3,473,890 which corresponds thereto, the entire disclosure of which is incorporated and relied on herein.

The amorphous sodium aluminum silicates used in the process according to the invention can, for example, show the following physical-chemical characteristics:

| | |
|---|---|
| Drying loss | 5–6% |
| Ignition. | 10–11% |
| $SiO_2$ | 74% |
| $Al_2O_3$ | 7% |
| $Na_2O$ | 7% |
| $SO_4$ | 0.5% |
| CaO | 0.2% |
| $Fe_2O_3$ | 0.1% |
| Specific gravity | 2.0 $g/cm^3$ |
| Bulk density | 75 g/l |
| Compacted apparent density | 160 g/l |
| pH value | 11 |
| BET surface area | 55 $m^2/g$ |
| DBA number | 80 |
| Primary particle diameter | 35 nm |
| Or | |
| Drying loss | 6.0% |
| Ignition loss | 13.0% |
| $SiO_2$ | 70.0% |
| $Al_2O_3$ | 9.0% |
| CaO | 0.4% |
| $Na_2O$ | 7.0% |
| $SO_4$ | 0.3% |
| $Fe_2O_3$ | 0.1% |
| Specific gravity | 1.94 |
| Bulk density | 80 g/l |
| Compacted apparent density | 130 g/l |
| pH value | 10.5 |
| BET surface area | 130 $m^2$ |
| DBA number | 150 |
| Primary particle diameter | 35 nm |
| Or | |
| Appearance | loose white powder |
| BET surface area | 110 $m^2/g$ |
| Average size of the primary particles | 35 millimicrons |
| Bulk density | 150 g/l |
| Settling volume (according to DIN 53,194) | 700 ml/100 g |
| Drying loss (according to DIN 53,198, Procedure A) (2 hours at 105° C.) | 6% |
| Ignition loss (according to DIN 52,911 (2 hours at 1000° C.) | 7% |
| pH value (according to DIN 53,200) (in 5% aqueous dispersion) | 10.4 |
| Density | 2.1 $g/cm^3$ |
| Refractive Index | 1.46 |
| White content at 460 nm | 98% |
| Lightness value A (according to DIN 53,163) | 95% |
| $SiO_2$* | 76% |
| $Al_2O_3$* | 8.5% |
| $Fe_2O_3$ | 0.05% |
| $Na_2O$* | 7.5% |
| Oversize according to Mocker (according to DIN 53,580) | 0.01% |

*Based on the substance dried at 105° C. for two hours.

The amorphous sodium aluminum silicate can be used as powder and/or as hydrous filter cake.

The $Na_2O$-supplying compound can be sodium hydroxide, sodium silicate, or sodium aluminate.

The seed mixture can preferably be produced by starting with the $Na_2O$-supplying compound in aqueous solution, preferably at 10° to 35° C. (room temperature) and adding the amorphous sodium aluminum silicate with stirring. In this process, the following quantitative ratios are maintained: Na$_2$O:Al$_2$O$_3$:SiO$_2$:H$_2$O=(12±3):1:(15±3):(240±60). The seed mixture must be aged for at least 24 hours at 10° to 35° C. (room temperature). It can be used for up to one year.

The process according to the invention shows the following advantages:

The synthetic amorphous sodium aluminum silicates used as starting compounds are always available in adequate purity and in practically unlimited quantities.

In the production of the seed mixture according to the invention, the components SiO$_2$ and Al$_2$O$_3$ are present in the sodium aluminum silicate in a fixed stoichiometric ratio. Metering errors can be excluded, because preferably only dilute sodium hydroxide solution and/or water are required for adjusting the mole ratios. Minor corrections of the SiO$_2$:Al$_2$O$_3$ ratio may optionally be carried out by the use of Na$_2$O-containing liquors, which contain small quantities of Al$_2$O$_3$ or SiO$_2$.

The seed mixtures produced according to the invention surprisingly show no tendency toward gelling. They can be used for faujasite synthesis even after some months, e.g., for up to one year, without recognizable changes.

With the seed mixture according to the invention, faujasites of type Y and type X can be produced, for which known starting materials and known reaction mixtures can be used.

In particular, reaction conditions such as are described in the prior art (German Pat. No. 1,038,016[1]; German Pat. No. 1,098,929[2]; and German Pat. No. 1,203,239[3]) can be selected. The entire disclosures of these three documents is incorporated herein and relied on.

[1] = U.S. Pat. No. 2,882,244
[2] = GB Pat. No. 909,266
[3] = U.S. Pat. No. 3,130,007

The seed mixture can be added in amounts of 0.5 to 10 volume percent, preferably 2 to 3 volume percent, based on the synthesis mixture.

EXAMPLE 1

Seed mixture according to the invention 41 liters of water is placed in a 100-liter container with stirrer and 14.3 liters of 50% sodium hydroxide solution ($\rho$=1.52, 589 g/l) is added. The solution is cooled to room temperature. 16.2 kg of amorphous sodium aluminum silicate (Degussa commercial product P 820: 76% SiO$_2$, 8.5% Al$_2$O$_3$, 7.5% Na$_2$O, ignition loss at 1000° C. 7%, pH value 10.4, BET surface area 110 m$^2$/g) is stirred into this. 52 liters of a mobile suspension with the composition Na$_2$O:Al$_2$O$_3$:SiO$_2$:H$_2$O = 12:1:15:240 is obtained.

EXAMPLE 2

Seed mixture according to the invention 36.6 liters of water is placed in a 100-liter container with stirrer and 12.6 liters of 50% sodium hydroxide solution ($\rho$=1.52, 589 g Na$_2$O) is added. After cooling to room temperature, 17 kg of amorphous sodium aluminum silicate (Degussa commercial product AS 7: 74% SiO$_2$, 7% Al$_2$O$_3$, 7% Na$_2$O, ignition loss at 1000° C. 11%, pH value 11, BET surface area 55 m$^2$/g) is stirred in. Approximately 44 liters of a mobile suspension with the composition Na$_2$O:Al$_2$O$_3$:SiO$_2$:H$_2$O = 12:1:18:240 is obtained.

EXAMPLE 3

Seed mixture according to the invention 3955 milliliters of water and 846 g of caustic soda are placed in a 10-liter container with stirring. After cooling to room temperature, 1457 g of amorphous sodium aluminum silicate (Degussa commercial product AS 9: 70% SiO$_2$, 9% Al$_2$O$_3$, 7% Na$_2$O, ignition loss at 1000° C. 13%, pH value 10.5, BET surface area 130 m$^2$/g) is stirred in. Approximately 4 liters of a mobile suspension with the composition Na$_2$O:Al$_2$O$_3$:SiO$_2$:H$_2$O = 9.5:1:13.2:187 is obtained.

EXAMPLE 4

Production of zeolite Y 1400 liters of water and 93 liters of 50% sodium hydroxide solution ($\rho$=1.52, 589 g/l Na$_2$O) are mixed in a 2-m$^3$ container with multi-stage impulse countercurrent stirrer and are heated to 80° C. 513 kg of a precipitated silica (Degussa commercial product VN 3: 89% SiO$_2$, ignition loss at 1000° C. 10%) is metered into this with vigorous stirring over a period of 1.5 hours. 497 liters of aluminate liquor (229 g/l Na$_2$O, 165 g/l Al$_2$O$_3$, $\rho$=1.35) is then metered into this within 17 minutes at the same temperature with vigorous stirring and vigorous stirring is continued for another 10 minutes. The synthesis mixture has a composition of Na$_2$O:Al$_2$O$_3$:SiO$_2$:H$_2$O=3.4:1:9.5:140. 52 liters of seed mixture according to Example 1 is added to this with slow stirring. The seed mixture had been aged at room temperature for 118 hours. The suspension is heated to 97° C. and is crystallized for 15 hours, with slow stirring. The suspension is then cooled to 50° C. and the zeolite is filtered off, washed until the pH value of the effluent wash water is less than 10.5, and dried at 110° C. 328 kg of zeolite Y with a cell constant of a$_o$=24.70 (water absorption capacity 30.2%, ignition loss at 1000° C. 15.7%) is obtained.

EXAMPLE 5

Production of zeolite Y 657 ml of water glass (100 g/l Na$_2$O, 347 g/l SiO$_2$, $\rho$=1.35) is placed in a 1-liter Quickfit flask with Teflon stirrer, dropping funnel, internal thermometer, and jacket heating. A solution of 30 g of caustic soda in 205 ml of water is added to this. The sodium silicate solution then has a temperature of 40° C. 102 ml of aluminate liquor (283 g/l Na$_2$O, 200 g/l Al$_2$O$_3$, $\rho$=1.416) is added dropwise to this within 10 minutes. The synthesis mixture has a composition of Na$_2$O:Al$_2$O$_3$:SiO$_2$:H$_2$O=8.5:1:19:250. 5.1 ml of a seed mixture (aging time: 9 days) according to Example 2 is then added. The suspension is heated to 98° C. and is crystallized for 4 hours. Vigorous stirring is carried out throughout the whole synthesis. The reaction mass is then filtered off on a suction filter and washed until the wash water has a pH value below 10.5. After drying at 110° C., 55 g of zeolite Y with a cell constant a$_o$=24.72 A (water absorption capacity=32.3%, ignition loss at 1000° C. 17.0%) is obtained.

EXAMPLE 6

Production of zeolite Y

The synthesis mixture is prepared as described in Example 5. 26 ml according to Example 3 is added as a seed mixture. After the work-up, 105 g of zeolite Y with a cell constant $a_o=24.66$ (water absorption capacity 30.9%, ignition loss at 1000° C. 15%) is obtained.

EXAMPLE 7

Production of zeolite X 543 liters of sodium silicate solution (88 g/l Na$_2$O, 246 g/l SiO$_2$, $\rho=1.25$), and 60 liters of 50% sodium hydroxide solution ($\rho=1.52$, 58 g/l Na$_2$O) are mixed in a 2-m$^3$ container with multi-stage impulse countercurrent stirrer and adjusted to 30° C. 1000 liters of an aluminate liquor, which was prepared by mixing 289 liters of aluminate liquor (189 g/l Na$_2$O, 157 g/l Al$_2$O$_3$, $\rho=1.30$) and 725 liters of water, is pumped into this within 60 minutes. The synthesis mixture has a composition of Na$_2$O:Al$_2$O$_3$:SiO$_2$:H$_2$O=5:1:5:250. After this, 55 liters of seed mixture according to Example 1 (aged for 28 days) is added. All of the steps are carried out with vigorous stirring. The vigorous stirring is now interrupted for two hours and is then continued for 4 hours at 98° C. during the crystallization. The work-up is carried out analogously to Example 4. 216 kg of zeolite X with a cell constant of 24.88 A (water absorption capacity 36.7%, ignition loss at 1000° C. 15%) is obtained.

The aging duration given in the foregoing examples; e.g. 118 hours, 9 days and 28 days, are representative. Longer and shorter aging times may be used provided that a minimum of 24 hours is used. The upper limit on aging is not necessarily critical.

Further variations and modifications of the invention will be apparent to those skilled in the art from the foregoing description which are intended to be encompassed by the claims which follow.

We claim:

1. A process for the production of a seed mixture for faujasite synthesis, comprising reacting amorphous, synthetic sodium aluminum silicate, in the form of a powder or filter cake, with an Na$_2$O-supplying compound, selected from the group consisting of sodium hydroxide, sodium silicate and sodium aluminate, in an aqueous system at temperatures of 10° to 35° C. whereby a mixture is obtained having Na$_2$O:Al$_2$O$_3$:SiO$_2$:H$_2$O in the ratio $(12\pm3):1:(15\pm3):(240\pm60)$ and allowing this mixture to age for at least 24 hours.

2. The process of claim 1 further comprising aging at 10° to 35° C.

3. The process according to claim 1, further comprising the amorphous sodium aluminum silicate having the following properties:
   SiO$_2$ content: 70-90% (based on anhydrous substance)
   Al$_2$O$_3$ content: 6-10% (based on anhydrous substance)
   Na$_2$O content: 5-9% (based on anhydrous substance)
   BET surface area: 50-150 m$^2$/g
   pH value: 10-11.

4. A process for the synthesis of faujasite comprising first forming a seed mixture by reacting an amorphous, synthetic sodium aluminum silicate, in the form of a powder or filter cake, with an Na$_2$O-supplying compound in an aqueous system at a temperature of 10° to 35° C. whereby a mixture is obtained having structural formula: Na$_2$O:Al$_2$O$_3$:SiO$_2$:H$_2$O=$(12\pm3):1:(15\pm3):(240\pm60)$, permitting said mixture to age for at least 24 hours to thereby obtain a seed mixture and thereafter adding said seed mixture in the amount of 0.5 to 10 volume percent to a faujasite synthesis mixture formed by mixing water, sodium hydroxide, aluminum oxide and silica in sufficient amounts to produce said synthesis mixture,
   thereby forming a suspension which is heated and crystallized to recover the faujasite product.

5. In the process according to claim 4, further comprising in that the faujasite is a zeolite of type X.

6. The process according to claim 4, further comprising in that faujasite is a zeolite of type Y.

7. A process according to claim 1, further comprising permitting said mixture to age for at least 24 hours at a temperature of 10° to 35° C.

8. A seed mixture for faujasite synthesis produced by the method of claim 1.

9. A seed mixture for faujasite synthesis comprising the formula: Na$_2$O:Al$_2$O$_3$:SiO$_2$:H$_2$O having the composition $(12\pm3):1:(15\pm3):(240\pm60)$ and having been produced from a Na$_2$O suppling compound selected from the group consisting of sodium hydroxide, sodium silicate and sodium aluminate.

10. The seed mixture according to claim 9 having been prepared from amorphous sodium aluminum silicate in the form of a powder or a filter cake.

11. The seed mixture according to claim 10 wherein said silicate has the following properties and wherein the weight amounts are on an anhydrous basis:
    SiO$_2$ content: 70-90%
    Al$_2$O$_3$ content: 6-10%
    Na$_2$O content: 5-9%
    BET surface area: 50-150 m$^2$/g
    pH value: 10-11.

12. A process for the production of a seed mixture for faujasite synthesis, comprising mixing water with an Na$_2$O supplying compound selected from the group consisting of sodium hydroxide, sodium silicate and sodium aluminate, cooling to room temperature and thereafter adding amorphous sodium aluminum silicate, in the form of a powder or filter cake, at temperatures of 10° to 35° C. wherein a mixture is obtained having the formulation Na$_2$O:Al$_2$O$_3$:SiO$_2$:H$_2$O=$(12\pm3):1:(15\pm3):(240\pm60)$, permitting this mixture to age for at least 24 hours in order to thereby obtain a seed mixture that shows no tendency toward gelling.

* * * * *